United States Patent [19]

Ringelhaan

[11] 3,979,687
[45] Sept. 7, 1976

[54] LINE AMPLIFIER
[75] Inventor: Otmar E. Ringelhaan, Munich, Germany
[73] Assignee: Siemens Aktiengesellschaft, Berlin & Munich, Germany
[22] Filed: Sept. 5, 1975
[21] Appl. No.: 610,759

[30] Foreign Application Priority Data
Sept. 20, 1974  Germany............................ 2445135

[52] U.S. Cl.................................... 330/17; 330/20; 330/21; 330/22; 330/28; 330/31; 330/40
[51] Int. Cl.² ........................................ H03F 3/189
[58] Field of Search ................... 330/21, 20, 22, 17, 330/28, 31, 40; 179/170 R, 170 T; 178/70 R, 70 TS

[56]  References Cited
UNITED STATES PATENTS
3,124,759   3/1964   Dahlberg .......................... 330/20 X

*Primary Examiner*—James B. Mullins
*Attorney, Agent, or Firm*—Hill, Gross, Simpson, Van Santen, Steadman, Chiara & Simpson

[57]  ABSTRACT

A line amplifier for transmission lines utilizing one or more transistors in combination with a Zener diode and utilizing a pnp and npn transistor interconnected with impedances to ground such that the transmission system operates without power separating filters and does not have cut-off at the low frequency end of the band due to a power separating filter and does not give rise to phase distortions.

6 Claims, 3 Drawing Figures

LINE AMPLIFIER

BACKGROUND OF THE INVENTION

1. Field of the Invention

This invention relates in general to remote line amplifier arrangements for carrier frequency transmission lines and in particular to a novel line amplifier.

2. Description of the Prior Art

Generally remotely-fed line amplifiers for transmission lines have required remote power separating filter so as to separate signal current from the supply current. Because of such filters the transmission system cuts off low frequency components and in order to move the cut-off frequency to a lower frequency range expensive filters are required, however, the problem of low frequency cut-off remains. Also, wherein low frequency cut-off occurs phase distortions arise which can interfere with the transmission and such phase distortions become particularly large if there is a long chain of repeater amplifier sections. For example, the transmission of pulses such as utilized in hybrid pulse systems is substantially impeded due to such phase distortion and interferes with the accurate transmission of intelligence. The use of remote power separating filters becomes impractical when the transmission of multi-stage pulses are utilized.

SUMMARY OF THE INVENTION

The present invention comprises a remote-fed line amplifier arrangement which can function without power separating filters. The problem is solved in the present invention by providing complimentary npn and pnp transistors in which the collector of the npn-transistor is connected to the base of the pnp-transistor and the collector of the pnp transistor is connected to ground through a first impedance and through a second impedance to the emitter of the npn-transistor and to an input terminal which supplies feed current and signal input. The base of the npn-transistor is connected through a third impedance to ground and to a signal output and feed current output terminal through a fourth impedance and parallel connected Zener diode and capacitor. The output terminal is connected to the emitter of the pnp-transistor and to the base of the pnp-transistor through a resistor. The impedance of the second and first impedance is selected such that the ratio is equal to the desired amplification factor and the fourth impedance is chosen so that its ratio to the third impedance is equal to the desired amplification factor minus 1.

A main advantage of the remote-fed line amplifier of the invention lies in the fact that there is no low-end frequency cut-off and no corresponding phase delay distortions in the transmission line.

Another advantage of the invention is that the line amplifier can be simply and inexpensively constructed.

Other objects, features and advantages of the invention will be readily apparent from the following description of preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

A preferred embodiment of the line amplifier of the invention provides a first impedance comprising a series connection of a first ohmic resistor and a first capacitor and a second impedance comprising a second ohmic resistance. The third impedance of the invention consists of the series connection of a third ohmic resistor and a second capacitor. The line amplifier of the present invention produces a voltage amplification factor of 1 at low frequencies and the amplification factor steadily increases at higher frequencies and, thus, compensates for the frequency-dependent damping of a cable at higher frequencies. The present line amplifier is relatively simple to fabricate utilizing thin film techniques because there are no inductances utilized in the circuit.

Figure 1:
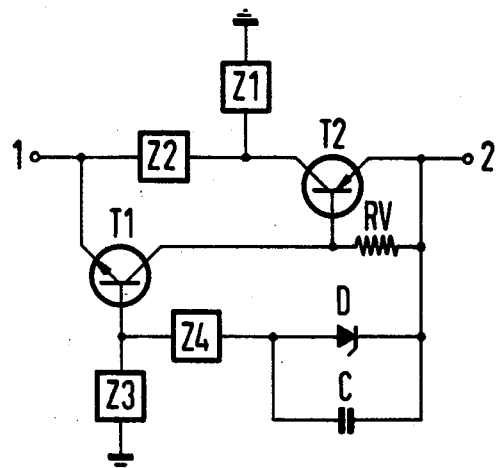
FIG. 1 is an electrical schematic of a line amplifier according to the invention.

FIG. 1 illustrates an input terminal 1 to which signal current and feed current is applied and an output terminal 2. A first transistor T1 which may be of the npn type has its emitter connected to input transistor 1 and its collector connected to the base of a second transistor T2 which may be of the pnp type. The collector of transistor T1 and the base of transistor T2 is connected through a resistor RV to the output terminal 2. The output terminal 2 is connected to the emitter of transistor T2. The collector of transistor T2 is connected through a first impedance Z1 to ground. The collector of transistor T2 is also connected through a second impedance Z2 to the input terminal 1.

The base of transistor T1 is connected to ground through a third impedance Z3. The base is also connected to one side of a fourth impedance Z4 which has its other side connected to the parallel combination of a Zener diode D and a capacitor C. The output terminal 2 is connected to the second side of the Zener diode D and the capacitor C.

For simplicity of understanding the switching arrangement illustrated in FIG. 1, the first impedance Z1 and third impedance Z3 can be eliminated and the amplifier switching arrangement can be considered as a two terminal network having terminals 1 and 2. When current is supplied, the two terminal network responds like a Zener diode because the collector-base voltage of both of the transistors will be below the overload range. The largest portion of the direct current supplied to input terminal 1 flows to the output terminal 2 through the second impedance Z2 and the pnp-transistor T2. For this reason, the direct current resistance of impedance Z2 must be small, otherwise the voltage drop would be too great. The resistance of the two terminal network to alternating currents is very small and it can be switched into the line voltage without causing a significant drop in alternating current voltage in the line.

It is to be realized that the two transistors can be interchanged to complimentary types wherein the npn-transistor T1 is interchanged with the pnp-transistor T2, however, in such case the Zener diode D and the working current must also be reversed in polarity.

Figure 2:
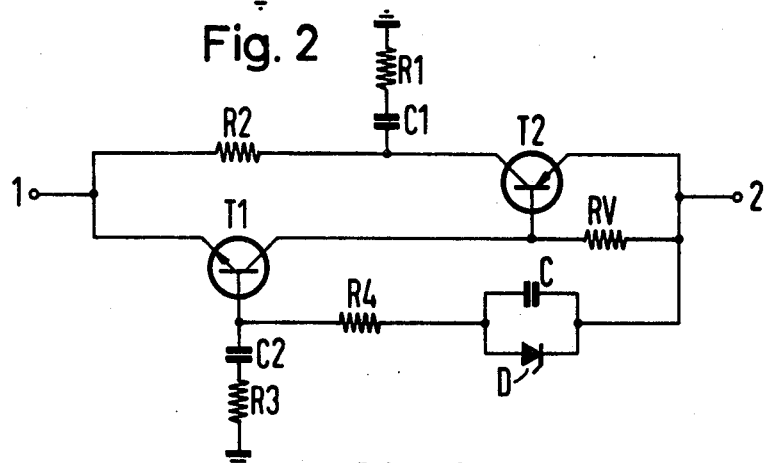
FIG. 2 illustrates a specific embodiment of the line amplifier of the invention.

FIG. 2 illustrates a practical embodiment of the line amplifier according to the invention wherein transistor T1 is of the type 2N918 and transistor T2 is of a type 2N2894A. The first impedance Z1 comprises a resistor R1 with one side connected to ground and having a resistance value of 30 ohms and the other side connected to a capacitor C1 having a value of 470 pF.

The second impedance Z2 comprises a resistor R2 having a resistance value of 240 ohms. The compensating resistance RV is a resistor having a resistance value of 1,000 ohms. The third impedance Z3 comprises a series capacitor C2 having a value of 180 pF and a resistor R3 having a resistance value of 22 ohms connected in series between the base of transistor T1 and ground.

The fourth impedance Z4 comprises a resistor R4 having a resistance value of 560 ohms.

The capacitor C has a value of 1 nF. The Zener diode is a type BZX 55 C10.

At a very low frequencies, the capacitors C1 and C2 have very high impedance and the amplifier may be regarded as a two terminal network having a voltage amplification factor of 1. As frequency increases, the impedance and consequently the feedback impedance of both of the capacitors C1 and C2 decreases and the amplification factor slowly increases. The rise in amplification can be adjusted so as to correspond to the frequency response curve of the transmission line by appropriately selecting the correct combination of values of the resistor R4 and the capacitor C. The specific examples of components given above relative to FIG. 2 were used with a large CCI-coaxial line (2.6/9.5) as the type of cable with each length being 2.4 km in length and wherein the frequency response curve is corrected over the range between 0 and 12 MHz. In the present invention, a very uniform rise in amplification factor results since the circuit does not include any inductors and a peak of attenuation does not occur as in conventional amplifiers equipped with shunts.

Because transistor T1 operates in a grounded-base circuit and the transistor T2 operates in a grounded common collector circuit, the maximum amplification which can be attained is limited. However, significantly higher amplification can be obtained by inserting an additional npn-transistor and an pnp-transistor in cascade with the illustrated circuit.

Figure 3:
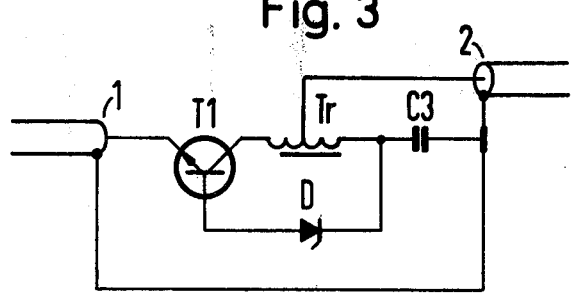
FIG. 3 illustrates a modification of a line amplifier according to the invention.

Under conditions where the requirements for rectification and compensation for distortion are less stringent the circuit can be substantially simplified by utilizing the circuit of FIG. 3. In FIG. 3, the center conductor 6 of the input coaxial line 3 is connected to the emitter of transistor T1 which may be an npn type and the outer conductor of the transmission line 3 is connected by a lead 5 to the outer conductor of the transmission line 4. The base of transistor T1 is connected through a Zener diode D and a capacitor C3 to the outer conductor of the transmission line 4. An autotransformer Tr has its main winding connected between the collector of transistor T1 and the junction point between Zener diode D and capacitor C3 and a tap from autotransformer Tr is connected to the center conductor 7 of the transmission line 4.

The circuit of FIG. 3 acts as a two terminal network at very low frequencies and the gain characteristic increases at higher frequencies. An approximation of the frequency curve response of the transmission line employed can be achieved by making the proper selection of the capacitance of capacitor C3 and the transformer ratio of the autotransformer Tr.

It is seen that this invention provides a novel line amplifier for a transmission line and although it has been described with respect to preferred embodiments it is not to be so limited as changes and modifications may be made which are within the full intended scope as defined by the appended claims.

I claim as my invention:

1. A remote line amplifier for use in transmission lines, comprising:
    signal and feed current input and output terminals,
    a npn-transistor and a pnp-transistor with the collector of said npn-transistor connected to the base of said pnp-transistor,
    a first impedance connected between ground and the collector of said pnp-transistor,
    a second impedance connected between said input terminal and the collector of said pnp-transistor,
    a third impedance connected between ground and the base of said npn-transistor,
    a fourth impedance with one side connected to the base of said npn-transistor,
    a Zener diode and a capacitor connected in parallel and connected between said fourth impedance and said outut terminal,
    a resistor connected between said outut terminal and the base of said pnp-transistor,
    said output terminal connected to the emitter of said pnp-transistor,
    said input terminal connected to the emitter of said npn-transistor,
    and the ratio of said impedance to said first impedance equal to the desired amplification factor and the ratio of said fourth impedance to said third impedance equal to the desired amplification factor minus 1.

2. A line amplifier according to claim 1 wherein said first impedance comprises of a series connection of a second resistor and a second capacitor, said second impedance comprises a third resistor, said third impedance comprises a series connection of a fourth resistor and a third capacitor, and said fourth impedance comprises a fifth resistor.

3. A remote line amplifier for use in transmission lines, comprising:
    signal and feed current input and output terminals,
    a first transistor of a first conductivity type and a second transistor of the opposite conductivity type with the collector of said first transistor connected to the base of said second transistor,
    a first impedance connected between ground and the collector of said second transistor,
    a second impedance connected between said input terminal and the collector of said second transistor,
    a third impedance connected between ground and the base of said first transistor,
    a fourth impedance with one side connected to the base of said first transistor,
    a Zener diode and a capacitor connected in parallel and connected between said fourth impedance and said output terminal,
    a resistor connected between said output terminal and
    the base of said second transistor,
    said output terminal connected to the emitter of said second transistor,
    said input terminal connected to the emitter of said first transistor,
    and the ratio of said second impedance to said first impedance equal to the desired amplification factor and the ratio of said fourth impedance to said third impedance equal to the desired amplification factor minus 1.

4. A line amplifier according to claim 3 wherein said first impedance comprises of a series connection of a second resistor and a second capacitor, said second impedance comprises a third resistor, said third impedance comprises a series connection of a fourth resistor and a third capacitor, and said fourth impedance comprises a fifth resistor.

5. A line amplifier comprising an input line having center and outer conductors, an output line having center and outer conductors, a transistor with its emitter connected to the center conductor of said input line, a capacitor, a Zener diode connected between the base of said transistor and said capacitor, the other side of said capacitor connected to the outer conductor of said output line, an autotransformer with its primary connected between the collector of said transistor and the junction point between said Zener diode and said capacitor, and a tap point of said autotransformer connected to the center conductor of said output line.

6. A line amplifier according to claim 5 wherein said outer conductors of said input and output lines are connected together.

* * * * *